United States Patent
Liu et al.

(10) Patent No.: US 11,705,735 B2
(45) Date of Patent: Jul. 18, 2023

(54) METHOD AND APPARATUS FOR CONTROLLING POWER SUPPLY SYSTEM, AND SYSTEM

(71) Applicant: Huawei Digital Power Technologies Co., Ltd., Shenzhen (CN)

(72) Inventors: Wei Liu, Shanghai (CN); Zhiwu Xu, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/711,388

(22) Filed: Apr. 1, 2022

(65) Prior Publication Data
US 2022/0329075 A1 Oct. 13, 2022

(30) Foreign Application Priority Data
Apr. 1, 2021 (CN) .......................... 202110358208.0

(51) Int. Cl.
*H02J 3/38* (2006.01)
*H02S 40/32* (2014.01)
*H02J 3/46* (2006.01)

(52) U.S. Cl.
CPC ................ *H02J 3/381* (2013.01); *H02J 3/46* (2013.01); *H02S 40/32* (2014.12); *H02J 2300/26* (2020.01)

(58) Field of Classification Search
CPC .......... H02J 3/381; H02J 3/46; H02J 2300/26; H02S 40/32

USPC ........................................................... 307/82
See application file for complete search history.

(56) References Cited

U.S. PATENT DOCUMENTS

| | | | | |
|---|---|---|---|---|
| 2009/0284078 | A1* | 11/2009 | Zhang | G05F 1/67 307/82 |
| 2018/0175625 | A1 | 6/2018 | Mentele | |

FOREIGN PATENT DOCUMENTS

| | | |
|---|---|---|
| CN | 105871324 B | 12/2017 |
| CN | 110932310 A | 3/2020 |
| EP | 3783765 A1 | 2/2021 |

* cited by examiner

*Primary Examiner* — Hal Kaplan
(74) *Attorney, Agent, or Firm* — Rimon PC

(57) ABSTRACT

A photovoltaic system includes a controller and plurality of photovoltaic strings that are independently controlled. The controller enables some photovoltaic strings to be in a maximum power point tracking state, and the remaining photovoltaic strings to be in a power output limited state. The system implements maximum power point tracking detection so that the maximum power point power and the maximum power point voltage are updated in real time. Further, the working status of the power supply system can be fed back in real time, so that the photovoltaic system can predict the capacity of an energy storage apparatus or regulate charging and discharging of the energy storage apparatus. After a curtailment state ends, the photovoltaic system is relatively quickly restored to the normal working state, so that a loss of generated power is reduced.

20 Claims, 3 Drawing Sheets

200

S201: Determine that N photovoltaic strings meet the following condition:

$$\sum_{i=1}^{N} P_{max}(i) > P_{out}$$

S202: Control a direct current voltage conversion unit to enable X photovoltaic strings in the N photovoltaic strings to be in an MPPT state and N − X photovoltaic strings to be in a power output limited state, where N ≥ 2, 1 ≤ X ≤ N − 1, both N and X are positive integers, and the X photovoltaic strings meet the following condition:

$$\sum_{i=1}^{X} P_{max}(i) \leq P_{out}$$

FIG. 2

METHOD AND APPARATUS FOR CONTROLLING POWER SUPPLY SYSTEM, AND SYSTEM

CROSS-REFERENCE TO RELATED APPLICATION

This application claims priority to Chinese Patent Application No. 202110358208.0, filed on Apr. 1, 2021, which is hereby incorporated by reference in its entirety.

TECHNICAL FIELD

This application relates to a method and an apparatus for controlling a power supply system, and a system, and more specifically, to a method and an apparatus for detecting photovoltaic optical power information of a photovoltaic power supply system.

BACKGROUND

Photovoltaic power generation is an important renewable energy technology. With the continuous improvement of the industry, the scale of photovoltaic power generation continues to grow, and is gradually becoming an important component of the world's energy supply. Due to the obvious periodicity and volatility of photovoltaic power generation, safety and stability of a power grid are impacted when a large-scale photovoltaic power generation system joins the power grid. To improve the stability of output power, a curtailment process usually exists for a photovoltaic station. Undoubtedly, the curtailment process greatly reduces photovoltaic utilization. In a photovoltaic station with an energy storage apparatus, additional optical energy may be stored by using the energy storage apparatus to reduce the curtailment rate. Therefore, the photovoltaic station needs to detect the current photovoltaic optical power in real time, to predict a capacity of the energy storage apparatus or regulate charging and discharging of the energy storage apparatus.

However, when a string-type photovoltaic power generation system is confronted with the curtailment phenomenon, all strings bear a specific curtailment proportion together. Consequently, all the strings enter a power output limited state. The string in the power output limited state cannot perform normal maximum power point tracking (MPPT), and therefore cannot obtain current photovoltaic optical power information. Consequently, the photovoltaic station cannot accurately predict photovoltaic optical power information of a photovoltaic string.

SUMMARY

This application provides a method for controlling a power supply system, so that a photovoltaic station can still obtain photovoltaic optical power information of a photovoltaic string in a relatively timely manner in a curtailment state.

According to a first aspect, a method for controlling a power supply system is provided. The power supply system includes N photovoltaic strings, a direct current voltage conversion unit, an inverter unit, and a controller, the N photovoltaic strings are configured to convert optical energy into a direct current, the direct current voltage conversion unit is configured to convert a voltage of the direct current output by the N photovoltaic strings, and the inverter unit is configured to convert the direct current output by the direct current voltage conversion unit into an alternating current and supply power to a power grid. The method includes: The controller determines that the N photovoltaic strings meet the following condition: $\Sigma_{i=1}^{N} P_{max}(i) > P_{out}$, where $P_{max}(i)$ represents a maximum power point power corresponding to each of the N photovoltaic strings in previous maximum power point tracking MPPT, and $P_{out}$ represents a scheduling power of the inverter unit. The controller controls the direct current voltage conversion unit to enable X photovoltaic strings in the N photovoltaic strings to be in an MPPT state and N−X photovoltaic strings to be in a power output limited state, where $N \geq 2$, $1 \leq X \leq N-1$, both N and X are positive integers, and the X photovoltaic strings meet the following condition: $\Sigma_{i=1}^{X} P_{max}(i) \leq P_{out}$. Therefore, in the method for controlling a power supply system in this embodiment of this application, in a curtailment state, power limits on some photovoltaic strings are separately released, so that the photovoltaic strings are in a normal working state, and through MPPT detection, the photovoltaic strings can be independently controlled, and photovoltaic optical power information of the photovoltaic strings can be updated in real time.

Therefore, in the method for controlling a power supply system provided in this application, in the curtailment state, power limits on some photovoltaic strings are separately released, so that the photovoltaic strings are in the normal working state, and through MPPT detection, the photovoltaic strings can be independently controlled.

With reference to the first aspect, in some implementations of the first aspect, that the controller controls the direct current voltage conversion unit to enable X photovoltaic strings in the N photovoltaic strings to be in an MPPT state includes: The controller determines the maximum power point power $P'_{max}(i)$ of each of the X photovoltaic strings, where $i \in [1, X]$.

Therefore, in the method for controlling a power supply system in this embodiment of this application, in the curtailment state, power limits on the photovoltaic strings are separately released, so that the photovoltaic strings are in a normal working state. In this way, a maximum power point power of the photovoltaic strings can be updated in real time, and a photovoltaic station can predict a capacity of an energy storage apparatus or regulate charging and discharging of the energy storage apparatus.

With reference to the first aspect, in some implementations of the first aspect, that the controller controls the direct current voltage conversion unit to enable X photovoltaic strings in the N photovoltaic strings to be in an MPPT state includes: The controller determines a maximum power point voltage $U'_{max}(i)$ of each of the X photovoltaic strings, where $i \in [1, X]$.

Therefore, in the method for controlling a power supply system in this embodiment of this application, the maximum power voltage $U'_{max}$ of each photovoltaic string can be updated relatively quickly based on a method of separately releasing the power limits on the photovoltaic strings and performing MPPT detection. After the power supply system ends the curtailment state, each photovoltaic string can be more quickly adjusted to a maximum power point, to reduce a loss of generated power.

With reference to the first aspect, in some implementations of the first aspect, after the controller controls the direct current voltage conversion unit to enable X photovoltaic strings in the N photovoltaic strings to be in an MPPT state and N−X photovoltaic strings to be in a power output limited state, the method further includes: The controller controls the power conversion unit to enable the X photovoltaic strings to be in the power output limited state and Y photovoltaic strings in the N photovoltaic strings to be in the MPPT state, where the Y photovoltaic strings are at least one string in the N strings except the X strings, and $1 \leq Y \leq N-X$.

Therefore, in the method for controlling a power supply system provided in this application, in the curtailment state, power limits on the photovoltaic strings are released in turn, so that the photovoltaic strings are in a normal working state, and through MPPT detection, the photovoltaic strings can be independently controlled, and photovoltaic optical power information of each photovoltaic string can be updated in real time.

With reference to the first aspect, in some implementations of the first aspect, after the controller controls the direct current voltage conversion unit to enable X photovoltaic strings in the N photovoltaic strings to be in an MPPT state and N–X photovoltaic strings to be in a power output limited state, the method further includes: The controller determines that the N photovoltaic strings meet the following condition: $\Sigma_{i=1}^{N} P'_{max}(i) \leq P_{out}$; and the controller controls the direct current voltage conversion unit to enable all the N photovoltaic strings to be in the MPPT state.

With reference to the first aspect, in some implementations of the first aspect, that the controller controls the direct current voltage conversion unit to enable all the N photovoltaic strings to be in the MPPT state includes: The controller controls the direct current voltage conversion unit to enable the X photovoltaic strings in the N photovoltaic strings to perform MPPT based on $U'_{max}(i)$, where $i \in [1, X]$.

Therefore, in the method for controlling a power supply system in this embodiment of this application, based on the updated maximum power point voltage $U'_{max}$ of the photovoltaic string, the photovoltaic string is enabled to perform MPPT based on the updated maximum power point voltage $U'_{max}$ after a power limit on the photovoltaic string is released next time. After the system releases the power limit, the photovoltaic string can relatively quickly track a maximum power point, so that MPPT detection duration is reduced, and running efficiency of the system is improved.

With reference to the first aspect, in some implementations of the first aspect, that the controller controls the direct current voltage conversion unit to enable X photovoltaic strings in the N photovoltaic strings to be in an MPPT state and N–X photovoltaic strings to be in a power output limited state includes: The controller determines that an $i^{th}$ photovoltaic string in the N photovoltaic strings meets the following condition: $P_{max}(i) \leq P_{out}$, where $i \in [1, N]$; and the controller controls the direct current voltage conversion unit to enable the $i^{th}$ photovoltaic string in the N photovoltaic strings to be in the MPPT state and remaining photovoltaic strings to be in the power output limited state.

Therefore, in the method for controlling a power supply system in this embodiment of this application, power limits on the photovoltaic strings are released one by one, so that the photovoltaic strings are in a normal working state, and through MPPT detection, photovoltaic optical power information of the N photovoltaic strings can be updated in real time when the power supply system in the curtailment state.

With reference to the first aspect, in some implementations of the first aspect, a curtailment rate η of the N photovoltaic strings is determined according to the following formula:

$$\eta = \frac{P_{out}}{\sum_{N} P'_{max}(i)}.$$

Therefore, in the method for controlling a power supply system in this embodiment of this application, in the curtailment state, a working status of the power supply system can be fed back in real time by calculating the curtailment rate of the N photovoltaic strings, so that a photovoltaic station can predict a capacity of an energy storage apparatus or regulate charging and discharging of the energy storage apparatus.

With reference to the first aspect, in some implementations of the first aspect, after the controller controls the direct current voltage conversion unit to enable the $i^{th}$ photovoltaic string in the N photovoltaic strings to be in the MPPT state and remaining photovoltaic strings to be in the power output limited state, the method further includes: The controller determines that the N photovoltaic strings meet the following condition: $\Sigma_{i=1}^{N} P'_{max}(i) \leq P_{out}$; and the controller controls the direct current voltage conversion unit to enable the N photovoltaic strings to be in the MPPT state.

With reference to the first aspect, in some implementations of the first aspect, that the controller controls the direct current voltage conversion unit to enable the N photovoltaic strings to be in the MPPT state includes: The controller controls the direct current voltage conversion unit to enable the N photovoltaic strings to perform MPPT based on $U'_{max}(i)$, where $i \in [1, N]$.

Therefore, in the method for controlling a power supply system in this embodiment of this application, based on updated the maximum power point voltage $U'_{max}$ of each photovoltaic string, the photovoltaic string is enabled to perform MPPT based on the updated maximum power point voltage $U'_{max}$ after a power limit on the photovoltaic string is released next time. Therefore, the photovoltaic string can relatively quickly track a maximum power point, so that MPPT detection duration is reduced, and running efficiency of the system is improved.

According to a second aspect, an apparatus for controlling a power supply system is provided, and includes the method for controlling a power supply system according to the first aspect or any possible implementation of the first aspect.

According to a third aspect, a power supply system is provided, and includes: N photovoltaic strings, where the N photovoltaic strings are configured to convert optical energy into a direct current; a direct current voltage conversion unit, where the direct current voltage conversion unit is configured to convert voltage of the direct current output by the N photovoltaic strings; an inverter unit, where the inverter unit is configured to convert the direct current output by the direct current voltage conversion unit into an alternating current and supply power to a power grid; and a controller, where the controller is configured to perform the method for controlling a power supply system according to the first aspect or any possible implementation of the first aspect.

Based on the foregoing technical solutions, the photovoltaic station can still obtain the photovoltaic optical power information of the photovoltaic string in a relatively timely manner in the curtailment state, so that the photovoltaic strings are independently controlled and MPPT detection is implemented, and the maximum power point power and the maximum power point voltage are updated in real time. Further, the working status of the power supply system can be fed back in real time, so that the photovoltaic station can predict the capacity of the energy storage apparatus or regulate charging and discharging of the energy storage apparatus. After the curtailment state ends, the photovoltaic supply system is relatively quickly restored to the normal working state, so that a loss of generated power is reduced.

DESCRIPTION OF DRAWINGS

FIG. 2 is a schematic flowchart of a method for controlling a power supply system according to an embodiment of this application.

DESCRIPTION OF EMBODIMENTS

The following describes technical solutions of this application with reference to accompanying drawings.

Technical solutions in embodiments of this application may be applied to a photovoltaic power generation system, and the photovoltaic optical power of a grid-tied component in a photovoltaic station is predicted, and a curtailment rate is calculated.

Figure 1:
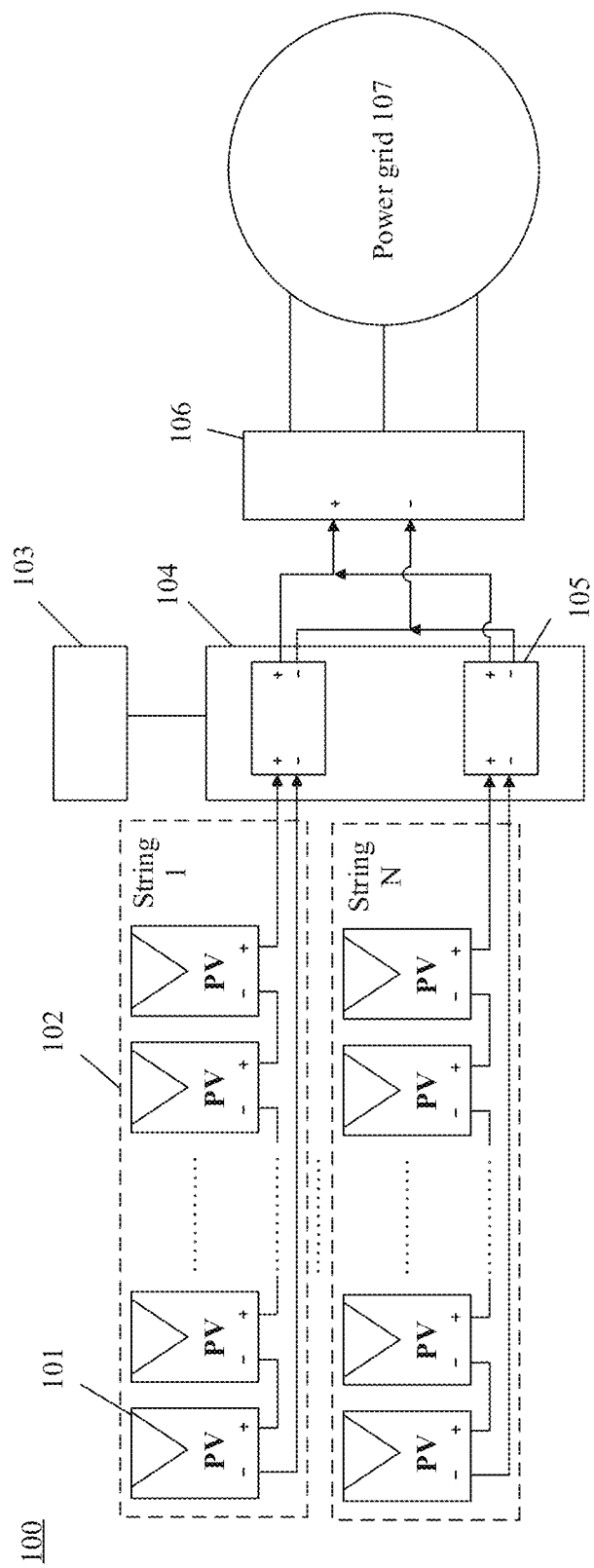
FIG. 1 is a schematic diagram of an architecture of a photovoltaic power generation system used in an embodiment of this application.

FIG. 1 is a schematic diagram of a photovoltaic power generation system 100 applicable to a method for controlling a power supply system according to an embodiment of this application. As shown in the figure, the photovoltaic power generation system 100 includes a power grid 107, an inverter unit 106, a direct current voltage conversion unit 104, a controller 103, and a photovoltaic array including N photovoltaic strings 102. The N photovoltaic strings 102 are configured to convert optical energy into a direct current; the direct current voltage conversion unit 104 is configured to convert voltage of the direct current output by the N photovoltaic strings; and the inverter unit 106 is configured to convert the direct current output by the direct current voltage conversion unit 104 into an alternating current and supply power to the power grid 107. The controller 103 may control the direct current conversion unit 104 to enable the N photovoltaic strings to switch between different working states.

FIG. 1 shows only an example of a group of photovoltaic arrays including the N photovoltaic strings 102, the direct current voltage conversion unit 104, the controller 103, and the inverter unit 106 that are corresponding to the photovoltaic array. In addition, the photovoltaic power generation system 100 in this embodiment of this application may further include a plurality of groups of other photovoltaic arrays and a plurality of direct current voltage conversion units 104, controllers 103, and inverter units 106 that are corresponding to the plurality of groups of other photovoltaic arrays. This is not limited in this application.

As shown in FIG. 1, one photovoltaic string 102 includes several photovoltaic components 101 connected in series. 5 to 25 photovoltaic components 101 are connected in series in each string. N photovoltaic strings 102 in similar structures are connected in parallel to form one photovoltaic array. An output end of the photovoltaic array is connected to an input end of the direct current voltage conversion unit 104, and the voltage of an input end of the photovoltaic array is referred to as bus voltage. The direct current voltage conversion unit 104 includes several direct current voltage conversion modules 105, and each direct current voltage conversion module 105 may independently control a photovoltaic string 102 corresponding to the direct current voltage conversion module 105. Under the control of the controller 103, the direct current voltage conversion unit 104 may independently control each photovoltaic string 102 by using the direct current voltage conversion module 105. An output end of the direct current voltage conversion unit 104 is connected to an input end of the inverter unit 106, an output end of the inverter unit 106 is connected to the power grid, and the inverter unit 106 implements direct current (DC) to alternating current (AC) conversion, inverts a direct current into an alternating current, and sends the alternating current to the power grid.

It should be understood that one direct current voltage conversion module 105 may access a plurality of photovoltaic strings at the same time, and the direct current voltage conversion module 105 synchronously controls the photovoltaic strings to switch between different working states. In this case, the plurality of different direct current voltage conversion modules 105 can still independently control photovoltaic strings respectively corresponding to the plurality of different direct current voltage conversion modules 105.

It should be understood that the controller 103 may be an independent device, may be disposed on the direct current voltage conversion unit 104, or may be disposed on the inverter unit 106. Optionally, the controller 103 may include a plurality of control modules that are located on each direct current voltage conversion module 105. The control modules may communicate with each other in a wired or wireless manner, or a control module on one of the direct current voltage conversion modules 105 is a primary control module, and can control a secondary control module on another direct current voltage conversion modules 105. This is not limited in this application.

It should be understood that in the N different photovoltaic strings 102, quantities of photovoltaic components 101 that are connected in series inside the N different photovoltaic strings 102 may not be entirely the same, and power of the photovoltaic components 101 may not be entirely the same. A power difference of the photovoltaic components may be caused by different models of the photovoltaic components, or may be affected by external factors such as light and blocking. If one of the photovoltaic components or an optimizer fails, the component can be accordingly removed, or access can be recovered after the fault is eliminated. Similarly, power and voltage of different photovoltaic strings may not be entirely the same.

In an optional manner, before accessing the input end of the direct current voltage conversion unit 104, the photovoltaic components 101 may form the photovoltaic string 102 through a serial connection or a parallel connection. A larger quantity of photovoltaic components connected in series leads to higher input voltage. A larger quantity of photovoltaic components connected in parallel leads to a higher input current.

If output power of the inverter unit is not limited, the controller 103 may control the direct current voltage conversion unit 104 to enable the N photovoltaic strings to be in a normal working state. In the normal working state, the N photovoltaic strings may work at a maximum power point; in other words, output power of the photovoltaic string tracks maximum power point power of the photovoltaic string. The controller 103 may control the N photovoltaic strings to perform MPPT detection, and may monitor photovoltaic optical power of each photovoltaic string in real time. In this case, current output power of the direct current voltage conversion unit 104 is:

$$P_{in} = \Sigma_{i=1}^{N} P_{max}(i).$$

A quantity N of photovoltaic strings controlled by the controller 103 is a positive integer, and N≥2. $P_{max}(i)$ is power of an $i^{th}$ string at a maximum power point of the $i^{th}$ string.

If the controller 103 receives an instruction, it indicates that the current scheduling power of the inverter unit, that is, the maximum output power allowed by the direct current voltage conversion unit 104 is $P_{out}$. If $\Sigma_{i=1}^{N}P_{max}(i) \leq P_{out}$, the current output power of the direct current voltage conversion unit 104 does not exceed a limit of the maximum output power $P_{out}$, and in this case, all the photovoltaic strings may work at maximum power points. If the controller receives a scheduling instruction and decreases $P_{out}$, $\Sigma_{i=1}^{N}P_{max}(i) > P_{out}$ until the current output power of the direct current voltage conversion unit 104 exceeds the limit of the maximum output power $P_{out}$. In this case, the photovoltaic station enters a curtailment state to avoid an impact to the security of the power grid when the photovoltaic power generation accesses the power grid. The controller 103 controls the photovoltaic string to enter a power output limited state. In the power output limited state, the photovoltaic string is switched from the maximum power point to a stable working point with a lower output power, that is, the output power of the photovoltaic string is reduced to meet the limit of the maximum output power of the inverter unit, and the maximum power point power of the photovoltaic string is no longer tracked. When the photovoltaic string is in the power output limited state, the controller 103 cannot control the photovoltaic string to perform MPPT, and cannot monitor the photovoltaic optical power of the photovoltaic string.

For the photovoltaic string in the power output limited state, the controller 103 cannot control the photovoltaic string to perform MPPT, and cannot monitor the photovoltaic optical power of the photovoltaic string. Consequently, the power supply system cannot predict a capacity of an energy storage apparatus, and cannot regulate a charging/discharging situation of the energy storage apparatus. In addition, after a power limit disappears, the controller needs to control the photovoltaic string to quickly track the maximum power point, to reduce a loss of power generated by the photovoltaic system.

To predict the photovoltaic optical power of the photovoltaic power generation system in the power limited state, and to enable the photovoltaic string to quickly track the maximum power point after a power limit ends, the following methods may be used:

Method 1: A solar irradiation angle is calculated based on longitude and latitude and time of the photovoltaic station by using an astronomical algorithm, maximum power is predicted based on a tilt angle of a battery panel and a power parameter, and the predicted maximum power is calibrated based on a current weather status.

Method 2: Output power in a period of time before power starts to be limited is directly recorded by using a data collection system, an output power curve is drawn, and photovoltaic optical power information in a next short period of time is predicted. When a power limit starts, the photovoltaic string separately stores voltage reference values before the power limit. After the power limit ends, all strings start to track maximum power points again from the stored voltage reference values until power tracking is stable.

However, both methods have problems of low accuracy and a large error. In method 1, influence factors of the sun on irradiation power of the battery panel are relatively complex. In addition, there is also an influence factor related to the environment, such as air quality. It is difficult to simulate a power change in a real and comprehensive manner by using the astronomical algorithm. In addition, it is difficult to make quantitative assessments of the weather on a given day, and the weather in ultra-short periods of time (for example, within 4 hours) is difficult to predict. These undetermined factors further increase the prediction error, and consequently, photovoltaic optical power prediction accuracy is poor. The method 2 does not rely on the astronomical algorithm and weather information, and before receiving a scheduling instruction for adjusting $P_{out}$, the controller can relatively accurately predict photovoltaic optical power in a short period of time. However, once the photovoltaic station performs power scheduling, and output power is no longer equal to maximum photovoltaic optical power, in other words, a curtailment phenomenon exists, photovoltaic optical power information in a next step cannot be predicted by using the original curve. In addition, in a case of a large fluctuation of light, the voltage reference value stored at the beginning of power limit seriously deviates from an actual maximum power voltage value. Consequently, a response delay is large and system recovery is slow when the system tracks a maximum power point again after the power limit ends.

In a complex scenario based on the photovoltaic power generation system, to detect photovoltaic optical power of a photovoltaic string in a relatively timely manner, this application provides a method for controlling a power supply system, so that the photovoltaic station can still obtain photovoltaic optical power information of the photovoltaic string in a relatively timely manner in a curtailment state.

FIG. 2 is a schematic flowchart of a method 200 for controlling a power supply system according to an embodiment of this application. The method 200 is performed by a controller 103. As shown in FIG. 2, the method 200 includes the following steps.

S201: The controller 103 determines that N photovoltaic strings meet the following condition: $\Sigma_{i=1}^{N}P_{max}(i) > P_{out}$, where $P_{max}(i)$ represents a maximum power point power corresponding to each of the N photovoltaic strings in previous maximum power point tracking MPPT, and $P_{out}$ represents a scheduling power of an inverter unit.

Specifically, after receiving a scheduling instruction for adjusting $P_{out}$, the controller 103 determines, based on a result recorded in previous MPPT detection, that the N photovoltaic strings meet a condition of limiting power output. If a sum $\Sigma_{i=1}^{N}P_{max}(i)$ of maximum power point power of the N photovoltaic strings in the previous MPPT exceeds a limit of $P_{out}$, a photovoltaic system needs to be in a curtailment state. The N photovoltaic strings cannot continue MPPT detection. Some or all photovoltaic strings are in a power output limited state, and cannot perform MPPT detection.

S202: The controller 103 controls a direct current voltage conversion unit 104 to enable X photovoltaic strings in the N photovoltaic strings to be in an MPPT state and N–X photovoltaic strings to be in the power output limited state, where N≥2, 1≤X≤N–1, both N and X are positive integers, and the X photovoltaic strings meet the following condition: $\Sigma_{i=1}^{X}P_{max}(i) \leq P_{out}$.

Specifically, in the curtailment state, the controller 103 controls the direct current voltage conversion unit 104, and separately controls the currents of the N photovoltaic strings by controlling the bus voltage, to independently control the photovoltaic strings. In addition, the controller 103 may alternatively independently control the photovoltaic strings in another manner. This is not limited in this application. In one working cycle, the controller 103 releases a power limit on one target photovoltaic string, so that the target photovoltaic string is in the MPPT state. In addition, under the action of the bus voltage, another photovoltaic string other than the target photovoltaic string enters a deep power output limited state; in other words, power compensation is performed. Output power of all the photovoltaic strings can still meet a maximum output power limit $P_{out}$.

It should be understood that the controller 103 can control at least two photovoltaic strings; in other words, N≥2. The controller 103 may release a power limit on only one target photovoltaic string at one time, or may release, by controlling X direct current voltage conversion modules 105, power limits on X target photovoltaic strings at one time, where 1≤X≤N−1. The X target photovoltaic strings on which power limits are released need to meet the maximum output power limit; in other words, the X photovoltaic strings meet $\Sigma_{i=1}^{X} P'_{max}(i) \leq P_{out}$.

Specifically, for the X target photovoltaic strings on which power limits are released, the controller 103 may control the X target photovoltaic strings to perform normal MPPT detection. After tracking is stable, the controller 103 may obtain and update maximum power point power $P'_{max}$ and maximum power point voltage $U'_{max}$ of the target photovoltaic string.

It should be understood that, when obtaining the maximum power point voltage $U'_{max}$ of the target photovoltaic string, the controller 103 may approach, in a stepped manner, a voltage reference value recorded in the previous MPPT, or may compare voltage reference values in a non-stepped manner. This is not limited in this application.

It should be understood that, an MPPT method used in this application may be a perturbation and observation method, an incremental conductance method, a current scanning method, a particle swarm algorithm, a genetic algorithm, or the like. This is not limited in this application.

After the X target photovoltaic strings perform MPPT, the controller 103 may control the direct current voltage conversion unit 104 to enable the X photovoltaic strings to be in the power output limited state and Y photovoltaic strings in the N photovoltaic strings to be in the MPPT state, where the Y photovoltaic strings are at least one string in the N strings except the X strings, and 1≤Y≤N−X.

Specifically, the controller 103 may release power limits on the photovoltaic strings in turn based on a similar method. After a plurality of working cycles, the controller 103 may separately record maximum power point power $P'_{max}$ and maximum power point voltage $U'_{max}$ of each photovoltaic string, to finally obtain a maximum photovoltaic optical power sum $\Sigma_{i=1}^{N} P'_{max}(i)$ of the direct current voltage conversion unit 104 that is updated in real time. Through comparison between $\Sigma_{i=1}^{N} P'_{max}(i)$ and $P_{out}$, a curtailment rate η currently used to represent a working efficiency of the N photovoltaic strings may be calculated:

$$\eta = \frac{P_{out}}{\sum_{i=1}^{N} P'_{max}(i)}.$$

In addition, the controller 103 may further upload curtailment rate data of the N photovoltaic strings to a central control unit for summarizing, to obtain the maximum real-time photovoltaic optical power and a curtailment rate of an entire power station.

It should be understood that the central control unit may be configured to schedule the controller 103, or may be configured to collect running data of a plurality of controllers 103, for example, MPPT information, photovoltaic optical power information, and curtailment rate data that are of the N photovoltaic strings and that are recorded by the controller 103. The central control unit may be a device on a power grid side, such as a data collector, or may be a scheduling module integrated into another device. This is not limited in this application. Communication between the central control unit and the controller 103 may be in a wired communication manner, or may be in a wireless communication manner. This is not limited in this application. It should be understood that a photovoltaic central control system is merely an optional module in embodiments of this application. If only photovoltaic optical power and a curtailment rate of a photovoltaic array corresponding to one direct current voltage control unit needs to be calculated, the central control unit may not be selected.

It should be understood that the scheduling instruction used to adjust $P_{out}$ may be sent to the controller by the central control unit or a device or a module such as a host computer that is in the photovoltaic power supply system and that is configured to send a control instruction to the photovoltaic station. This is not limited in this application.

It should be understood that the controller 103 may release the power limits on the photovoltaic strings in turn, and update maximum power point power $P'_{max}$ and maximum power point voltage $U'_{max}$ of the photovoltaic strings one by one. Optionally, the controller 103 may alternatively update $P'_{max}$ and $P'_{max}$ of some photovoltaic strings. The controller 103 may alternatively constantly release power limits on some photovoltaic strings, and repeatedly update the photovoltaic optical power of the photovoltaic strings and calculate a curtailment rate. This is not limited in this application.

Therefore, in the method for controlling a power supply system in this embodiment of this application, in a curtailment state, power limits on the photovoltaic strings are separately released, so that the photovoltaic strings are in a normal working state, and through MPPT detection, the photovoltaic strings can be independently controlled, and photovoltaic optical power information of the photovoltaic strings can be updated in real time.

The controller 103 may repeat the foregoing control method, and may repeatedly update photovoltaic optical power information of a same photovoltaic string. After one update, the controller re-records the maximum power point voltage $U'_{max}$ of the photovoltaic string in the current MPPT detection. Therefore, when a power limit on the photovoltaic string is released next time, the controller 103 may control the photovoltaic string to start MPPT detection from $U'_{max}$.

Based on the method of separately releasing the power limits on the photovoltaic strings and performing MPPT detection, the controller 103 may relatively quickly update the maximum power voltage $U'_{max}$ of each photovoltaic string. Therefore, based on the maximum power point voltage $U'_{max}$ of each photovoltaic string that is updated in real time, the photovoltaic string can quickly track a maximum power point after the power limit is released next time, so that MPPT detection duration is reduced.

Correspondingly, after the power supply system ends the curtailment state, the controller 103 determines that the N photovoltaic strings meet the following condition: $\Sigma_{i=1}^{N} P'_{max}(i) \leq P_{out}$; and the controller 103 controls the direct current voltage conversion unit 104 to enable all the N photovoltaic strings to be in the MPPT state.

Specifically, the controller 103 controls the direct current voltage conversion unit 104 to enable X photovoltaic strings in the N photovoltaic strings to perform MPPT based on $U'_{max}(i)$, where $i \in [1, X]$.

Therefore, in the method for controlling a power supply system in this embodiment of this application, maximum power voltage $U'_{max}(i)$ of each photovoltaic string can be updated relatively quickly based on a method of separately releasing the power limits on the photovoltaic strings and performing MPPT detection. After the power supply system ends the curtailment state, each photovoltaic string can be more quickly adjusted to a maximum power point, to reduce a loss of generated power.

Figure 3:
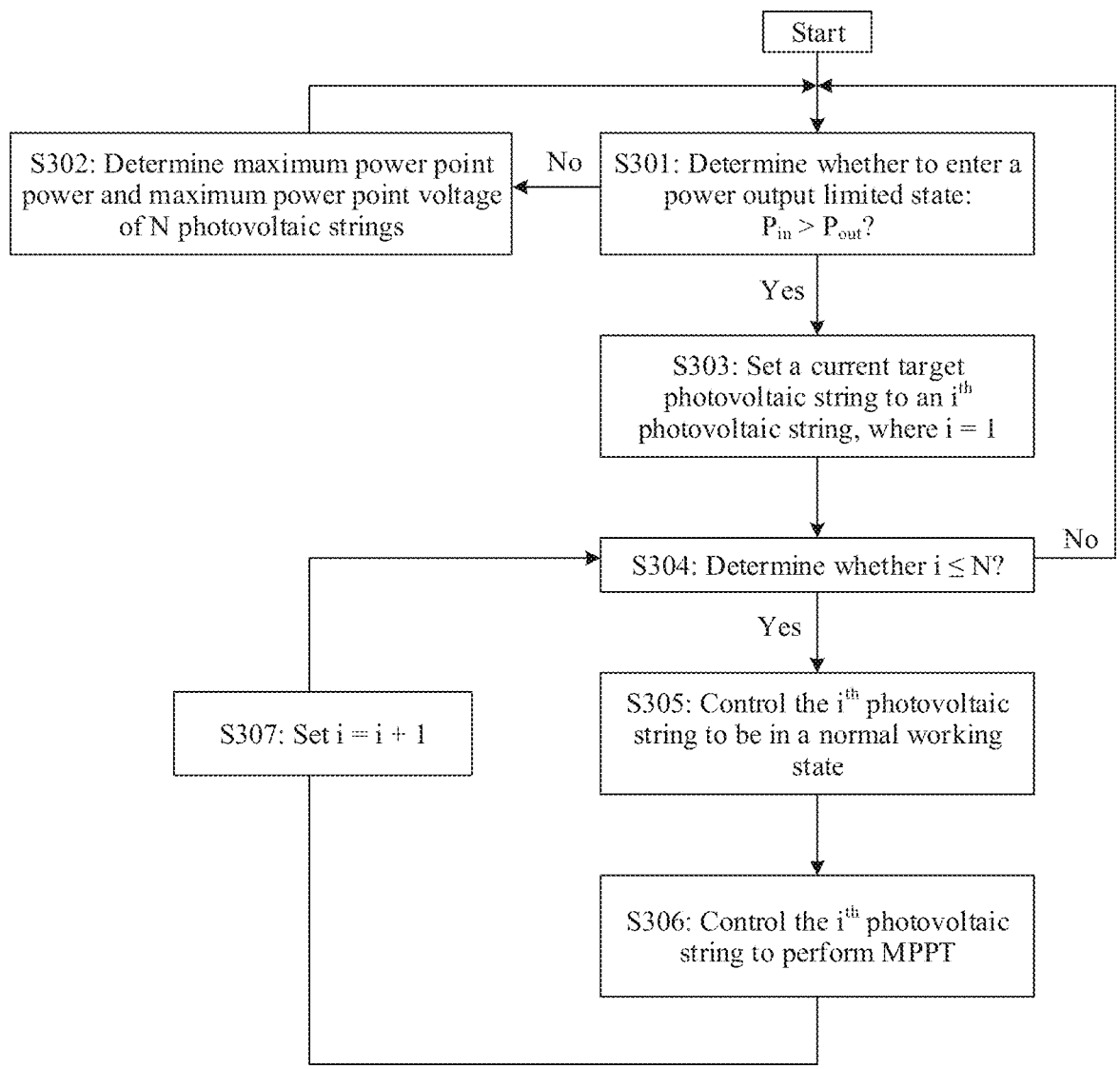
FIG. 3 is a schematic flowchart of a method for controlling a power supply system according to an embodiment of this application.

X=1 is used as an example below to describe the method for controlling a power supply system in this application with reference to a specific working cycle of the controller 103. FIG. 3 is a schematic flowchart of a method for controlling a power supply system according to an embodiment of this application. The method is performed by a controller 103.

S301: The controller 103 determines, based on the current output power $P_{in}$ and scheduling power $P_{out}$ that is of an inverter unit, whether a photovoltaic array enters a power output limited state. If $P_{in} \leq P_{out}$, step S302 is performed. If $P_{in} > P_{out}$, step S303 is performed.

$P_{in} = \Sigma_N P_{max}$, where $P_{max}$ represents the maximum power point power corresponding to each of the N photovoltaic strings in a previous MPPT, and the scheduling power $P_{out}$ of the inverter unit represents the currently allowed maximum output power of a direct current voltage conversion unit.

S302: The controller 103 determines a maximum power point power $P_{max}(i)$ and maximum power point voltage $U_{max}(i)$ of the N photovoltaic strings, and returns to step S201.

Specifically, if $P_{in} \leq P_{out}$, the photovoltaic array may be in a normal working state. The controller 103 may control the N photovoltaic strings to perform MPPT, and determine output a power $P_{max}(i)$ of each photovoltaic string at a maximum power point of the photovoltaic string and voltage $U'_{max}(i)$ corresponding to the maximum power point.

S303: Set a current target photovoltaic string to an $i^{th}$ photovoltaic string, where i=1.

S304: The controller 103 determines whether i≤N is satisfied, and performs step S305 if i≤N is satisfied, or returns to step S301 if i≤N is not satisfied.

S305: When i≤N, the controller 103 controls the $i^{th}$ photovoltaic string to be in a normal working state.

Specifically, the controller 103 may control a bus voltage, to separately control currents of the photovoltaic strings. The controller 103 releases a power limit on the $i^{th}$ photovoltaic string, so that the $i^{th}$ photovoltaic string is in the normal working state, and the output power of the photovoltaic string tracks the maximum power point power. In addition, under the action of the bus voltage, another photovoltaic string other than the target photovoltaic string enters a deep power output limited state; in other words, power compensation is performed. Output power of all the photovoltaic strings can still meet a maximum output power limit $P_{out}$.

S306: The controller 103 controls the $i^{th}$ photovoltaic string to perform MPPT.

Specifically, the controller 103 may determine and update the maximum power point power $P'_{max}(i)$ and the maximum power point voltage $U'_{max}(i)$ of the $i^{th}$ photovoltaic string.

S307: Set i=i+1, and return to step S304.

The controller 103 enters a second cycle, releases a power limit on an $(i+1)^{th}$ photovoltaic string, and updates the maximum power point power $P'_{max}(i+1)$ and maximum power point voltage $U'_{max}(i+1)$ of the $(i+1)^{th}$ photovoltaic string.

The controller 103 releases power limits on the N photovoltaic strings in turn, and updates photovoltaic optical power information, returns to step S301 until all the N photovoltaic strings are updated, and determines whether the photovoltaic array meets a condition of limiting power output.

After the cycle, the controller 103 may separately record the maximum power point power $P'_{max}(i)$ and maximum power point voltage $U'_{max}(i)$ of the N photovoltaic strings, to finally obtain a maximum photovoltaic optical power $\Sigma_N P'_{max}(i)$ of the entire photovoltaic array. Through comparison between $\Sigma_N P'_{max}(i)$ and $P_{out}$, a current curtailment rate η may be calculated.

$$\eta = \frac{P_{out}}{\sum_N P'_{max}(i)}.$$

In addition, the controller 103 may further upload curtailment rate data of one photovoltaic array to a central control unit for summarizing, to obtain maximum real-time photovoltaic optical power and a curtailment rate of an entire power station.

It should be understood that the controller 103 may repeat the foregoing steps, and continuously update the maximum power point power $P'_{max}(i)$ and the maximum power point voltage $U'_{max}$ of each photovoltaic string in real time.

Therefore, in the method for controlling a power supply system in this embodiment of this application, in a curtailment state, power limits on the photovoltaic strings are released one by one, so that the photovoltaic strings are in a normal working state, and through MPPT detection, the photovoltaic strings can be independently controlled, and the photovoltaic optical power information of the photovoltaic strings can be updated in real time.

It should be understood that, similar to the method 200, after the $i^{th}$ photovoltaic string is updated this time, the controller 103 re-records the maximum power point voltage $U'_{max}$. Therefore, when a power limit on the photovoltaic string is released next time, the controller 103 may control the $i^{th}$ photovoltaic string to start MPPT detection from $U'_{max}$. Correspondingly, after the photovoltaic array ends the curtailment state, the $i^{th}$ photovoltaic string may be more quickly adjusted from $U'_{max}$ to a maximum power point, to reduce a loss of generated power.

After N cycles from step S304 to step S307, the controller 103 may complete one round of updates of the photovoltaic optical power information for the N photovoltaic strings. After returning to step S301, if a sum $\Sigma_N P'_{max}(i)$ of the maximum power point power of the photovoltaic strings meets a scheduling power limit, that is, $\Sigma_N P'_{max}(i) \leq P_{out}$, the photovoltaic array may end the curtailment state and return to a normal working state. The controller 103 may control the N photovoltaic strings to perform MPPT. In this case, the controller 103 may control, based on the updated $U'_{max}(i)$, the N photovoltaic strings to perform MPPT.

Therefore, according to the method for controlling a power supply system in this embodiment of this application, after the photovoltaic optical power information of the N photovoltaic strings is updated and the curtailment state ends, the N photovoltaic strings are enabled to perform MPPT based on the most recently updated maximum power point voltage $U'_{max}$, so that each photovoltaic string can be more quickly adjusted to a maximum power point, and a photovoltaic power supply system can be more quickly restored to a normal working state, to reduce a loss of generated power.

It should be understood that, in this embodiment of this application, one direct current voltage conversion unit 104, one controller 103, and one inverter unit 106 may be combined into one inverter device to independently control the N photovoltaic strings to predict photovoltaic optical power information in real time. In independent MPPT and photovoltaic optical power prediction of the photovoltaic strings, a grid-tied output characteristic of the inverter is always kept consistent in theory, and does not affect another inverter component in an adjacent network. Therefore, different inverter components can independently predict photovoltaic optical power and calculate a curtailment rate, so that inverter-level real-time power prediction can be implemented.

In this embodiment of this application, independent MPPT detection of the photovoltaic strings is performed in a power output limited state. Tracking accuracy of the independent MPPT detection depends on the tracking accuracy of an inverter. Optical power prediction of a single grid-tied inverter component can reach an accuracy less than 1 kW. A period in which each inverter completes one round of photovoltaic optical power prediction is a quantity N of strings multiplied by the time of single MPPT tracking, and the time of single MPPT tracking can reach second-level accuracy. Therefore, curtailment rate prediction accuracy of a single inverter of 50 kW can reach at least 98%, and prediction time validity can reach less than one minute. Optical power and a curtailment rate can be basically fed back in real time.

It should be understood that an input stage of the inverter mentioned in this application is a DC/DC converter, and a topology of the inverter may be a buck circuit, a boost circuit, a buck-boost circuit, or a boost-boost circuit. An output stage of the inverter is a DC/AC converter, and there may be an intermediate stage. Different converters may be separated. The inverter converts energy and sends the energy to a power grid or supplies power to a load.

A central control system or an upper computer in a customer scheduling system can send scheduling instructions to the inverter to schedule a running state of an entire photovoltaic plant. This is not limited in this application.

This application further provides an apparatus for controlling a power supply system. The apparatus may correspond to the controller 103 for controlling a power supply system in the foregoing method embodiment, and may be configured to perform steps related to the controller 103 in the foregoing method embodiment. Therefore, beneficial effects in the foregoing method embodiment can also be implemented.

This application further provides a power supply system, including: N photovoltaic strings, configured to convert optical energy into a direct current; a direct current voltage conversion unit, configured to convert voltage of the direct current output by the N photovoltaic strings; an inverter unit, configured to convert the direct current output by the direct current voltage conversion unit into an alternating current and supply power to a power grid; and a controller, corresponding to the controller 103 for controlling a power supply system in the foregoing method embodiment, and configured to perform steps related to the controller 103 in the foregoing method embodiment. Therefore, beneficial effects in the foregoing method embodiment may also be implemented.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing apparatus and system, refer to a corresponding process in the foregoing method embodiment. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for controlling a power supply system comprising N photovoltaic strings, a direct current voltage conversion unit, an inverter unit, and a controller, wherein the N photovoltaic strings are configured to convert sunlight into a direct current, the direct current voltage conversion unit is configured to convert a voltage of a direct current output from the N photovoltaic strings, the inverter unit is configured to convert a direct current output from the direct current voltage conversion unit into an alternating current and supply the alternating current to a power grid, the method comprising:

determining, by the controller, that the N photovoltaic strings meet a condition that $\Sigma_{i=1}^{N} P_{max}(i) > P_{out}$, wherein $P_{max}(i)$ is a maximum power point power corresponding to each of the N photovoltaic strings in a previous maximum power point tracking (MPPT) and $P_{out}$ is a scheduling power of the inverter unit; and controlling, by the controller, the direct current voltage conversion unit to enable X photovoltaic strings in the N photovoltaic strings to be in an MPPT state, and N–X photovoltaic strings to be in a power output limited state, wherein N≥2, 1≤X≤N−1, both N and X are positive integers, and the X photovoltaic strings meet a condition that $\Sigma_{i=1}^{X} P_{max}(i) \leq P_{out}$.

2. The method according to claim 1, wherein controlling, by the controller, the direct current voltage conversion unit to enable X photovoltaic strings in the N photovoltaic strings to be in the MPPT state comprises:

determining, by the controller, a maximum power point power $P'_{max}(i)$ of each of the X photovoltaic strings, wherein $i \in [1, X]$.

3. The method according to claim 1, wherein controlling, by the controller, the direct current voltage conversion unit to enable X photovoltaic strings in the N photovoltaic strings to be in the MPPT state comprises:

determining, by the controller, a maximum power point voltage $U'_{max}(i)$ of each of the X photovoltaic strings, wherein $i \in [1, X]$.

4. The method according to claim 1, wherein after controlling, by the controller, the direct current voltage conversion unit to enable X photovoltaic strings in the N photovoltaic strings to be in the MPPT state, and N–X photovoltaic strings to be in the power output limited state, the method further comprises:

controlling, by the controller, the power conversion unit to enable the X photovoltaic strings to be in the power output limited state, and Y photovoltaic strings in the N photovoltaic strings to be in the MPPT state, wherein the Y photovoltaic strings are at least one string in the N strings except the X strings, and $1 \leq Y \leq N-X$.

5. The method according to claim 1, wherein after controlling, by the controller, the direct current voltage conversion unit to enable X photovoltaic strings in the N photovoltaic strings to be in the MPPT state, and N–X photovoltaic strings to be in the power output limited state, the method further comprises:

determining, by the controller, that the N photovoltaic strings meet a condition that $\Sigma_{i=1}^{N} P'_{max}(i) \leq P_{out}$; and controlling, by the controller, the direct current voltage conversion unit to enable all of the N photovoltaic strings to be in the MPPT state.

6. The method according to claim 5, wherein controlling, by the controller, the direct current voltage conversion unit to enable all of the N photovoltaic strings to be in the MPPT state comprises:

controlling, by the controller, the direct current voltage conversion unit to enable the X photovoltaic strings in the N photovoltaic strings to perform MPPT based on $U'_{max}(i)$, wherein $i \in [1, X]$.

7. The method according to claim 6, wherein the method further comprises: determining a curtailment rate $\eta$ of the N photovoltaic strings according to a formula $$\eta = \frac{P_{out}}{\sum_{i=1}^{N} P'_{max}(i)}.$$

8. The method according to claim 1, wherein controlling, by the controller, the direct current voltage conversion unit to enable X photovoltaic strings in the N photovoltaic strings to be in the MPPT state, and N–X photovoltaic strings to be in the power output limited state comprises:

determining, by the controller, that an $i^{th}$ photovoltaic string in the N photovoltaic strings meets a condition that $P_{max}(i) \leq P_{out}$, wherein $i \in [1, N]$; and controlling, by the controller, the direct current voltage conversion unit to enable the $i^{th}$ photovoltaic string in the N photovoltaic strings to be in the MPPT state, and the remaining photovoltaic strings to be in the power output limited state.

9. The method according to claim 8, wherein after controlling, by the controller, the direct current voltage conversion unit to enable the $i^{th}$ photovoltaic string in the N photovoltaic strings to be in the MPPT state, and the remaining photovoltaic strings to be in the power output limited state, the method further comprises:

determining, by the controller, that the N photovoltaic strings meet the condition $\Sigma_{i=1}^{N} P'_{max}(i) \leq P_{out}$; and controlling, by the controller, the direct current voltage conversion unit to enable the N photovoltaic strings to be in the MPPT state.

10. The method according to claim 8, wherein controlling, by the controller, the direct current voltage conversion unit to enable the N photovoltaic strings to be in the MPPT state comprises:

controlling, by the controller, the direct current voltage conversion unit to enable the N photovoltaic strings to perform MPPT based on $U'_{max}(i)$, wherein $i \in [1, N]$.

11. An apparatus for controlling a power supply system, wherein the power supply system comprises N photovoltaic strings, a direct current voltage conversion unit, and an inverter unit, wherein the N photovoltaic strings are configured to convert sunlight into a direct current, the direct current voltage conversion unit is configured to convert a voltage of a direct current output from the N photovoltaic strings, the inverter unit is configured to convert a direct current output from the direct current voltage conversion unit into an alternating current and supply the alternating current to a power grid, the apparatus comprising:

a controller, configured to determine that the N photovoltaic strings meet a condition that $\Sigma_{i=1}^{N} P_{max}(i) > P_{out}$, wherein $P_{max}(i)$ is a maximum power point power corresponding to each of the N photovoltaic strings in previous maximum power point tracking MPPT, and $P_{out}$ is a scheduling power of the inverter unit, wherein the controller is further configured to control the direct current voltage conversion unit to enable X photovoltaic strings in the N photovoltaic strings to be in an MPPT state, and N–X photovoltaic strings to be in a power output limited state, wherein $N \geq 2$, $1 \leq X \leq N-1$, both N and X are positive integers, and the X photovoltaic strings meet a condition that $\Sigma_{i=1}^{X} P_{max}(i) \leq P_{out}$.

12. The apparatus according to claim 11, wherein the controller is further configured to control the direct current voltage conversion unit to enable the X photovoltaic strings in the N photovoltaic strings to be in the MPPT state, and the controller is further configured to:

determine a maximum power point power $P'_{max}(i)$ of each of the X photovoltaic strings, wherein $i \in [1, X]$.

13. The apparatus according to claim 11, wherein the controller is further configured to control the direct current voltage conversion unit to enable the X photovoltaic strings in the N photovoltaic strings to be in the MPPT state, and the controller is further configured to:

determine maximum power point voltage $U'_{max}(i)$ of each of the X photovoltaic strings, wherein $i \in [1, X]$.

14. The apparatus according to claim 11, wherein after controlling the direct current voltage conversion unit to enable the X photovoltaic strings in the N photovoltaic strings to be in the MPPT state, and the N–X photovoltaic strings to be in the power output limited state, the controller is further configured to:

control the power conversion unit to enable the X photovoltaic strings to be in the power output limited state, and Y photovoltaic strings in the N photovoltaic strings to be in the MPPT state, wherein the Y photovoltaic strings are at least one string in the N strings except the X strings, and $1 \leq Y \leq N-X$.

15. The apparatus according to claim 11, wherein after controlling the direct current voltage conversion unit to enable the X photovoltaic strings in the N photovoltaic strings to be in the MPPT state, and the N−X photovoltaic strings to be in the power output limited state, the controller is further configured to:

determine that the N photovoltaic strings meet a condition that $\Sigma_{i=1}^{N} P'_{max}(i) \leq P_{out}$; and control the direct current voltage conversion unit to enable all the N photovoltaic strings to be in the MPPT state.

16. The apparatus according to claim 15, wherein the controller controls the direct current voltage conversion unit to enable all of the N photovoltaic strings to be in the MPPT state, and the controller is further configured to:

control the direct current voltage conversion unit to enable the X photovoltaic strings in the N photovoltaic strings to perform MPPT based on $U'_{max}(i)$, wherein $i \in [1, X]$.

17. The apparatus according to claim 16, wherein the method further comprises: determining a curtailment rate η of the N photovoltaic strings according to a formula $$\eta = \frac{P_{out}}{\sum_{i=1}^{N} P'_{max}(i)}.$$

18. The apparatus according to claim 11, wherein the controller controls the direct current voltage conversion unit to enable the X photovoltaic strings in the N photovoltaic strings to be in the MPPT state, and the N−X photovoltaic strings to be in the power output limited state, and the controller is further configured to:

determine that an $i^{th}$ photovoltaic string in the N photovoltaic strings meets a condition that $P_{max}(i) \leq P_{out}$, wherein $i \in [1, N]$; and control the direct current voltage conversion unit to enable the $i^{th}$ photovoltaic string in the N photovoltaic strings to be in the MPPT state, and the remaining photovoltaic strings to be in the power output limited state.

19. The apparatus according to claim 18, wherein after controlling the direct current voltage conversion unit to enable the $i^{th}$ photovoltaic string in the N photovoltaic strings to be in the MPPT state, and the remaining photovoltaic strings to be in the power output limited state, the controller is further configured to:

determine that the N photovoltaic strings meet the condition $\Sigma_{i=1}^{N} P'_{max}(i) \leq P_{out}$; and control the direct current voltage conversion unit to enable the N photovoltaic strings to be in the MPPT state.

20. The apparatus according to claim 18, wherein the controller controls the direct current voltage conversion unit to enable the N photovoltaic strings to be in the MPPT state, and the controller is further configured to:

control the direct current voltage conversion unit to enable the N photovoltaic strings to perform MPPT based on $U'_{max}(i)$, wherein $i \in [1, N]$.

\* \* \* \* \*

UNITED STATES PATENT AND TRADEMARK OFFICE
CERTIFICATE OF CORRECTION

PATENT NO. : 11,705,735 B2
APPLICATION NO. : 17/711388
DATED : July 18, 2023
INVENTOR(S) : Wei Liu et al.

It is certified that error appears in the above-identified patent and that said Letters Patent is hereby corrected as shown below:

In the Claims

In Column 14, Line 52, in Claim 1, delete "(MPPT)" and insert -- (MPPT), --.

Signed and Sealed this
Third Day of October, 2023

Katherine Kelly Vidal
Director of the United States Patent and Trademark Office